United States Patent

Xuan et al.

[11] Patent Number: 5,955,154
[45] Date of Patent: Sep. 21, 1999

[54] MAGNETIC RECORDING MEDIUM WITH LASER TEXTURED GLASS OR GLASS-CERAMIC SUBSTRATE

[75] Inventors: Jialuo Jack Xuan, Milpitas; Ga-Lane Chen, Fremont, both of Calif.

[73] Assignee: Seagate Technology, Inc., Scotts Valley, Calif.

[21] Appl. No.: 08/666,373

[22] PCT Filed: May 9, 1996

[86] PCT No.: PCT/US96/06830

§ 371 Date: Jun. 27, 1996

§ 102(e) Date: Jun. 27, 1996

[87] PCT Pub. No.: WO97/42629

PCT Pub. Date: Nov. 13, 1997

[51] Int. Cl.[6] .............................. B05D 3/00; B05D 5/12
[52] U.S. Cl. .................... 427/555; 427/557; 427/129; 427/131
[58] Field of Search .................... 427/555, 554, 427/556, 557, 558, 129, 131

[56] References Cited

U.S. PATENT DOCUMENTS

| | | |
|---|---|---|
| 3,674,340 | 7/1972 | Jacob et al. . |
| 3,764,218 | 10/1973 | Schedewie . |
| 3,938,878 | 2/1976 | Fox . |
| 4,060,306 | 11/1977 | Swaminathan . |
| 4,139,263 | 2/1979 | Lehureau et al. . |
| 4,307,408 | 12/1981 | Kiyohara et al. . |
| 4,724,219 | 2/1988 | Ridinger .................... 427/555 |
| 5,062,021 | 10/1991 | Ranjan et al. . |
| 5,120,927 | 6/1992 | Williams et al. . |
| 5,128,914 | 7/1992 | Kurata et al. . |
| 5,166,006 | 11/1992 | Lal et al. . |
| 5,202,810 | 4/1993 | Nakamura et al. . |
| 5,273,834 | 12/1993 | Hoover et al. . |
| 5,352,495 | 10/1994 | Henderson et al. .............. 427/555 |
| 5,391,522 | 2/1995 | Goto et al. . |
| 5,402,407 | 3/1995 | Eguchi et al. . |
| 5,416,755 | 5/1995 | Endo et al. . |
| 5,567,484 | 10/1996 | Baumgart et al. .............. 427/555 |
| 5,582,878 | 12/1996 | Ogawa et al. ................. 427/129 |
| 5,595,791 | 1/1997 | Beumgart . |
| 5,614,114 | 3/1997 | Owen .......................... 427/555 |
| 5,714,207 | 2/1998 | Kuo ............................ 427/555 |
| 5,741,560 | 4/1998 | Ross ........................... 427/555 |
| 5,798,164 | 8/1998 | Weiss et al. .................. 427/129 |
| 5,853,820 | 12/1998 | Kuo et al. ..................... 427/555 |

FOREIGN PATENT DOCUMENTS

| | | |
|---|---|---|
| 0447025 A1 | 9/1991 | European Pat. Off. . |
| 0652554 A1 | 5/1995 | European Pat. Off. . |

OTHER PUBLICATIONS

Kuo et al., "Laser Zone Texturing on Glass and Glass–Ceramic Substrates", IEEE Transactions on Magnetics, vol. 33, No. 1, Jan. 1997, pp. 944–949.

Teng et al., "Laser Zone Texture On Alternative Substrates Disks", IEEE, Transactions on Magnetics, vol. 32, No. 5, Sep. 1996, pp. 3759–3761.

*Handbook of Chemistry & Physics*, 56 th ed, ed. RC. Weast, Ph.D. excerpts from pp. B–8 and B–74, 1975 No Month.

Baumgart et al., "A New Laser Texturing Technique For High Performance Magnetic Disk Drives", IEEE Transactions on Magnetics, vol. 31. No. 6, Nov. 1995, pp. 2949–2951.

*Primary Examiner*—Marianne Padgett
*Attorney, Agent, or Firm*—McDermott, Will & Emery

[57] ABSTRACT

A magnetic recording medium is formed with a laser textured glass or glass-ceramic substrate. The use of a pulsed, focused laser light beam, such as a $CO_2$ derived laser light beam, enables the formation of an accurately textured landing zone on a glass or glass-ceramic substrate which is substantially replicated on subsequently applied layers.

16 Claims, 4 Drawing Sheets

MAGNETIC RECORDING MEDIUM WITH LASER TEXTURED GLASS OR GLASS-CERAMIC SUBSTRATE

TECHNICAL FIELD

The present invention relates to the recording, storage and reading of magnetic data, particularly rotatable magnetic recording media, such as thin film magnetic disks having textured surfaces for contact with cooperating magnetic transducer heads. The invention has particular applicability to high density magnetic recording media for mobile computer data storage applications.

BACKGROUND ART

Thin film magnetic recording disks and disk drives are conventionally employed for storing large amounts of data in magnetizable form. Typically, one or more disks are rotated on a central axis in combination with data transducer heads. In operation, a typical contact start/stop (CSS) method commences when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against a landing zone of the disk. Thus, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk landing zone and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

A typical magnetic recording medium is depicted in FIG. 1 and comprises a substrate 10, typically an aluminum (Al)-base alloy, such as an aluminum-magnesium (Al—Mg) alloy, plated with a layer of amorphous nickel-phosphorous (NiP). Substrate 10 typically contains sequentially deposited thereon a chromium (Cr) underlayer 11, a magnetic layer 12 which is usually a cobalt (Co)-base alloy, a protective overcoat 13 which usually comprises carbon, and a lubricant topcoat 14. Cr underlayer 11, Co-base alloy magnetic layer 12 and protective carbon overcoat 13 are typically deposited by sputtering techniques. A conventional Al-alloy substrate is provided with a NiP plating primarily to increase the hardness of the Al substrate, serving as a suitable surface for polishing to provide the requisite surface roughness or texture, which is intended to be substantially replicated on the disk surface.

The escalating requirements for high areal recording density impose increasingly greater requirements on thin film magnetic media in terms of coercivity, stiction squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the head renders it particularly difficult to satisfy the requirements for controlled texturing to avoid head crash.

Conventional techniques for providing a disk substrate with a textured surface comprise a mechanical operation, such as polishing. See, for example, Nakamura et al., U.S. Pat. No. 5,202,810. Conventional mechanical texturing techniques are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. In addition, various desirable substrates are difficult to process by mechanical texturing. This undesirably limiting facet of mechanical texturing, virtually excludes the use of many materials for use as substrates.

In copending application Ser. No. 08/608,072 filed on Feb. 28, 1996 (Our Docket No. 2674-019), a sputter texturing method is disclosed. The disclosed sputter texturing method can be advantageously applied to a plurality of different substrates.

Another alternative texturing technique to mechanical texturing comprises the use of a laser light beam focused on an upper surface of a non-magnetic substrate. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEE Transactions on Magnetics, Vol. 31, No. 6, pp. 2946–2951, November 1995. The laser texturing technique disclosed by Baumgart et al.

employs a single focusing lens, and the shape of the resulting protrusions are shown to be altered by adjusting the pulse energy. At low pulse energies, the bump or protrusion shape comprises a central depression and a surrounding rim, similar to that reported by Ranjan et al. As the pulse energy is increased, the bottom of the depression flattens into a rounded, smooth, central dome resembling a "sombrero." At higher powers, the central dome broadens and decreases in height to eventually become equal to or lower than the rim.

In copending application Ser. No. 08/666374 filed on Jun. 27, 1996 a laser texturing technique is disclosed employing a multiple lens focusing system for improved control of the resulting topographical texture. In copending application Ser. No. 08/647407 filed on May 9, 1996, now U.S. Pat. No. 5,783,797 issued Jul. 21, 1998 (Our Docket No.), a laser texturing technique is disclosed wherein a pulsed, focused laser light beam is passed through a crystal material to control the spacing between resulting protrusions.

Conventional laser texturing techniques have previously been applied to metal-containing substrates or substrates having a metal-containing surface, such as Ni—P plated Al or Al-base alloys. Such substrates, however, exhibit a tendency toward corrosion and are relatively fragile, thereby limiting their utility so that they are not particularly desirable for use in mobile computer data storage applications, such as laptop computers. Glass and glass-ceramic i.e., two-phase materials comprises an amorphous glass phase and a crystalline ceramic phase, substrates exhibit superior resistance to shock than Ni—P coated Al or Al-alloy substrates. Accordingly, glass and glass-ceramic substrates are desirable candidates for use in mobile computer data storage applications. However, it is extremely difficult to provide an adequate texture on a glass or a glass-ceramic substrate, particularly in view of the escalating requirements for high areal recording density.

Conventional practices for texturing a glass or glass-ceramic substrate comprise heat treatment. Goto et al., U.S. Pat. No. 5,391,522, discloses a glass ceramic substrate suitable for use in a magnetic recording medium. A textured surface is provided by heat treatment, during which the crystallization temperature is maintained for about 1 to about 5 hours to generate secondary crystal grains forming the surface texture characterized by irregular protrusions with surrounding valleys extending into substrate.

Hoover et al., U.S. Pat. No. 5,273,834 discloses the use of alternate substrates, such as glass-ceramic substrates. The substrate material is provided with ions for absorbing radiation in the near infrared portion of the spectrum, thereby rendering the material capable of attaining elevated temperatures during film deposition.

The use of heat treatment to form a textured surface on alternate substrates, such as glass or glass-ceramic substrates, is undesirably slow and inefficient in terms of energy consumption. Significantly, it is extremely difficult to exercise control over the size and shape of the secondary crystal grains due to inherent limitations in controlling temperature uniformity. Accordingly, it is virtually impossible to provide a glass or glass-ceramic substrate with a controlled textured landing zone for optimizing flying height and maximizing data zone recording density. Moreover, the resulting texture comprises irregularly shaped protrusions with surrounding valleys extending into the substrate, thereby creating undesirable stress profiles during subsequent deposition of layers by sputtering at elevated temperatures. Such undesirable stress profiles render it extremely difficult to accurately replicate the texture in subsequently deposited layers.

Accordingly, there exists a need to provide a magnetic recording medium comprising a glass or glass-ceramic substrate having an accurately controlled texture, and to provide a method of accurately texturing a glass or glass-ceramic substrate.

DISCLOSURE OF THE INVENTION

An object of the present invention is an accurately textured magnetic recording medium comprising a glass or glass-ceramic substrate having a high areal recording density and exhibiting low noise, improved flying stability and improved glide performance.

Another object of the present invention is a method of accurately texturing a glass or glass-ceramic substrate to provide a controllable topography.

Additional objects, advantages and other features of the invention will be set forth in the description which follows and in part will become apparent to those having ordinary skill in the art upon examination of the following or may be learned from the practice of the invention. The objects and advantages of the invention may be realized and obtained as particularly pointed out in the appended claims.

According to the present invention the foregoing and other objects are achieved in part by a magnetic recording medium comprising: a non-magnetic glass or glass-ceramic substrate having an upper surface; and a magnetic layer on the upper surface; wherein the upper surface contains a textured landing zone comprising a plurality of protrusions of secondary crystals grown on the upper surface by a focused, pulsed laser light beam.

Another aspect of the present invention is a method of manufacturing a magnetic recording medium, which method comprises: texturing the upper surface of a glass or glass-ceramic substrate with a pulsed, focused laser light beam.

Additional objects and advantages of the present invention will become readily apparent to those skilled in the art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
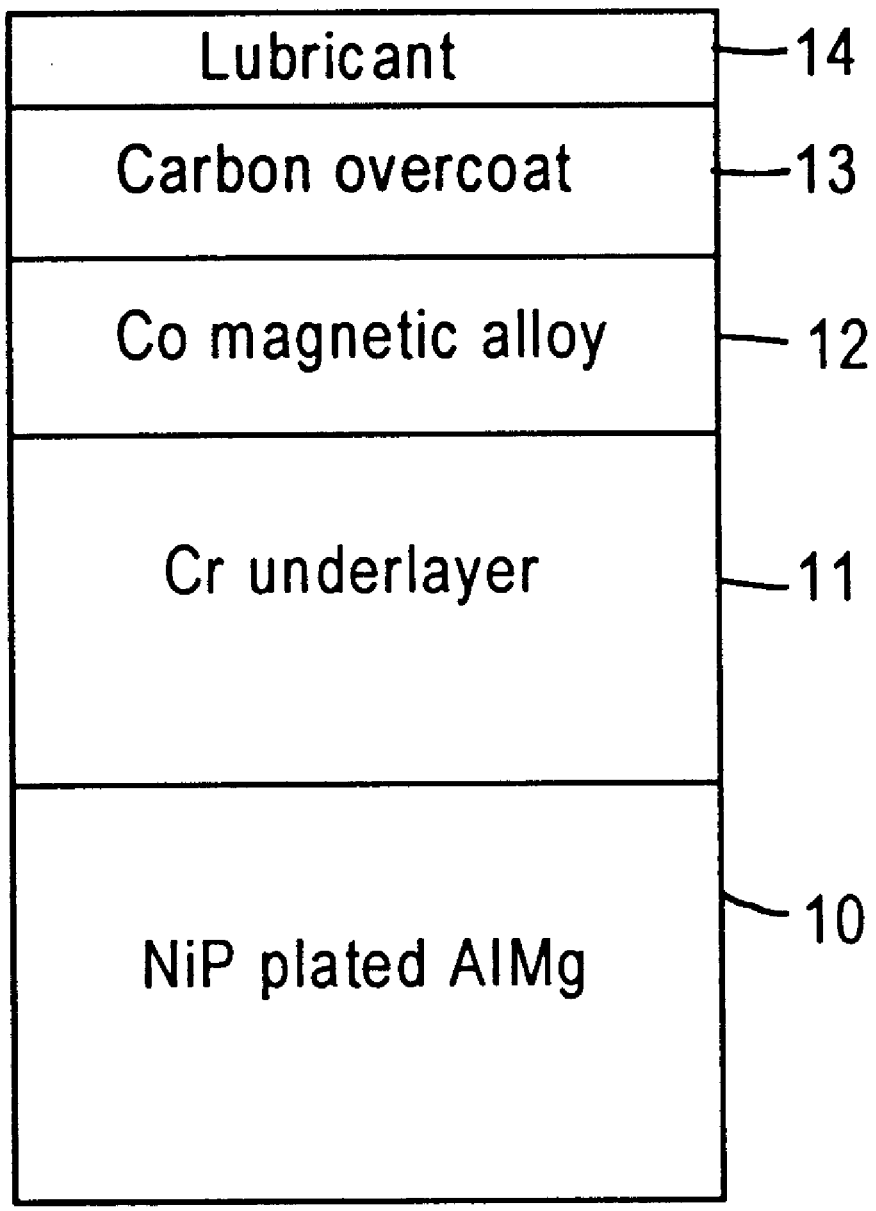
FIG. 1 schematically depicts a conventional magnetic recording medium structure.

The inability to control texturing of a glass or glass-ceramic substrate formed by conventional heat treating practices renders such conventional heat treatment unsuitable for providing glass or glass-ceramic substrate surfaces with an accurately textured landing zone leaving an untextured, e.g., polished or specular, data zone. The present invention overcomes the lack of control attendant upon conventional heat treatment practices for texturing a glass or glass-ceramic substrate.

After considerable investigation and experimentation, it was unexpectedly found that the surface of a glass or glass-ceramic substrate can be controllably and accurately textured employing a pulsed, focused laser light beam. The application of a pulsed, focused laser light beam, particularly a laser light beam having a wave length of about 10 $\mu$m, such as a laser light beam derived from a $CO_2$ laser source, enables accurate and controlled localized texturing of a glass or glass-ceramic substrate. Thus, in accordance with the present invention, a pulsed, focused laser light beam is employed to provide a precise delineation of the textured area boundary, thereby enabling accurate and reproducible formation of a textured landing zone having substantially uniform protrusions, while maximizing the area available for data storage. In addition, the ability to control texturing a landing zone enables control of the head/disk spacings while reducing friction and wear.

In an embodiment of the present invention, a glass or glass-ceramic substrate is exposed to a pulsed, focused $CO_2$ laser beam to form localized crystallization by short pulses. The resulting texture of the present invention is unexpectedly different from the texture produced by laser texturing a metal-containing surface, such as an NiP plated Al or Al-alloy substrate. The resulting texture of the present invention is also significantly different from the texture produced by heat treating a glass-ceramic substrate. In accordance with the present invention, the laser textured surface formed on the surface of a glass or glass-ceramic substrate comprises a plurality of relatively uniformly rounded protrusions extending above the substrate surface, without surrounding valleys extending substantially into the substrate. The typical laser texture formed on a metal substrate comprises a plurality of protrusions having a substantially circular rim extending around a central hole or a central bump. A typical texture formed by heat treating a glass-ceramic substrate, as disclosed in Goto et al., comprises a plurality of irregularly shaped protrusions with surrounding valleys extending into the substrate.

The laser generated topography in accordance with the present invention advantageously comprises a plurality of protrusions with substantially no surrounding valleys extending into the substrate to any substantial depth. Such a topography provides a favorable stress pattern during subsequent deposition of layers by sputtering at elevated temperatures, thereby enabling the substantially accurate replication of the textured pattern on subsequently deposited layers. The accuracy of the present invention enables texturing a selected portion of a glass or glass-ceramic substrate to form a controlled landing zone, with substantially no texturing provided in the data zone.

In accordance with an embodiment of the present invention, a pulsed, focused $CO_2$ laser beam is employed to provide localized crystallization on the surface of a glass or glass-ceramic substrate, thereby inducing the growth of secondary crystal grains in a controllably uniform manner. By controlling relevant process parameters, the protrusion height and curvature, as well as the protrusion density, are accurately controlled to meet glide and CSS performance for matching slider surface designs. For example, in accordance with the present invention, the laser power and mechanical movement of the substrate are controlled, thereby enabling control of the secondary crystal grains and, hence, control of the position of the protrusions, height, curvature and density.

Given the disclosed objectives, one having ordinary skill in the art can easily optimize the relevant parameters, such as the rotational speed of the substrate, pulse duration, i.e., a time/pulse energy and repetition rate, to control the resulting texture. For example, rotation of the substrate at a rate of about 200 rpm to about 1500 rpm, such as 500 rpm to about 1000 rpm, provides desirable results. It has been found that exposure of the glass or glass-ceramic substrate surface to a pulsed, focused $CO_2$ laser light beam for a duration of about 10 $\mu$sec to about 80 $\mu$sec, such as about 30 $\mu$sec to about 60 $\mu$sec, enables accurately controllable results. In addition, exposure of the substrate surface to a pulsed, focused laser beam at a pulse energy of about 20 microjoules ($\mu$j) to about 80 $\mu$j, such as about 30 $\mu$j to about 60 $\mu$j, at a repetition rate (pulse/second) of 1,000 to about 10,000, such as about 1,000 to about 5,000, enables accurately controllable results.

Figure 2:
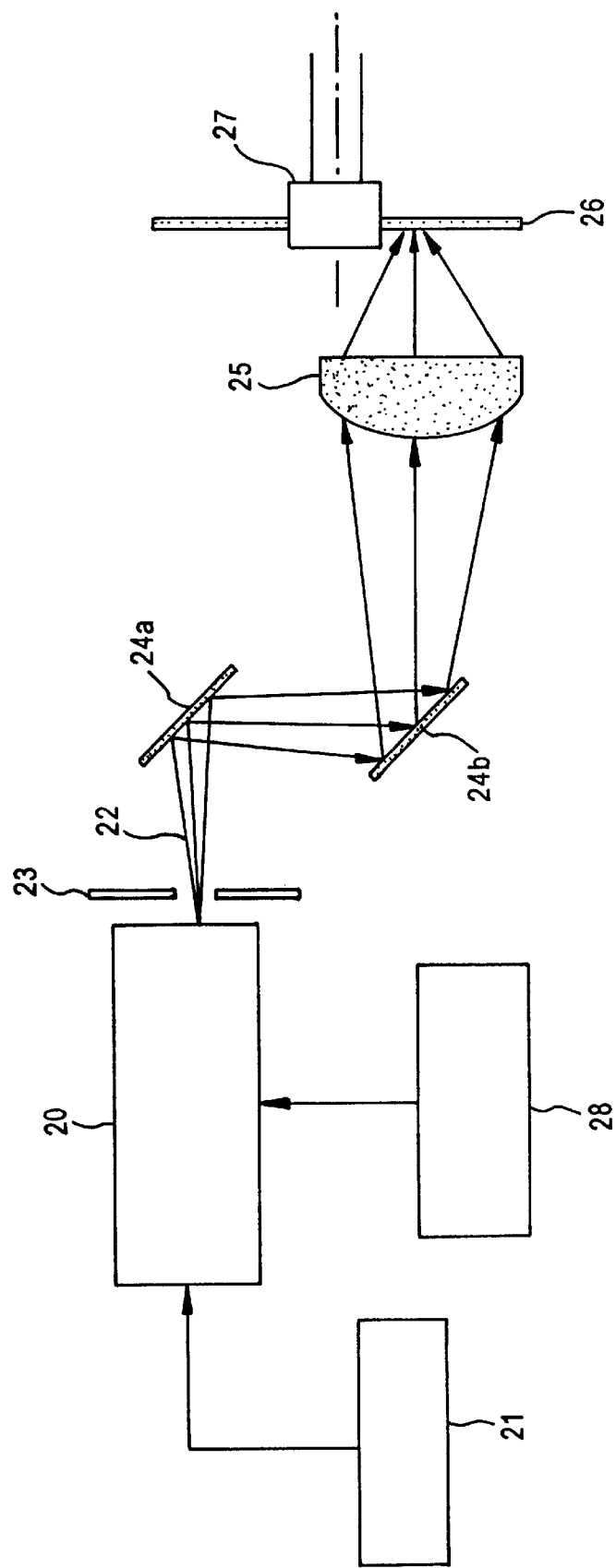
FIG. 2 schematically depicts a laser texturing system in accordance with an embodiment of the present invention.

An embodiment of a laser texturing system for use in the present invention is schematically depicted in FIG. 2, and comprises $CO_2$ laser source 20, controlled by controller 21 and powered by generator 28. Emitted laser light beam 22 passes through shutter 23 to an optical system 24 comprising mirrors 24a and 24b, such as silicon mirrors, and focusing lens 25 for focusing the pulsed laser light beam onto the surface of the glass or glass-ceramic substrate 26 rotated by spindle 27. It has been found advantageous to provide lens 25 with a suitable coating, such as lead selenide.

Figure 3:
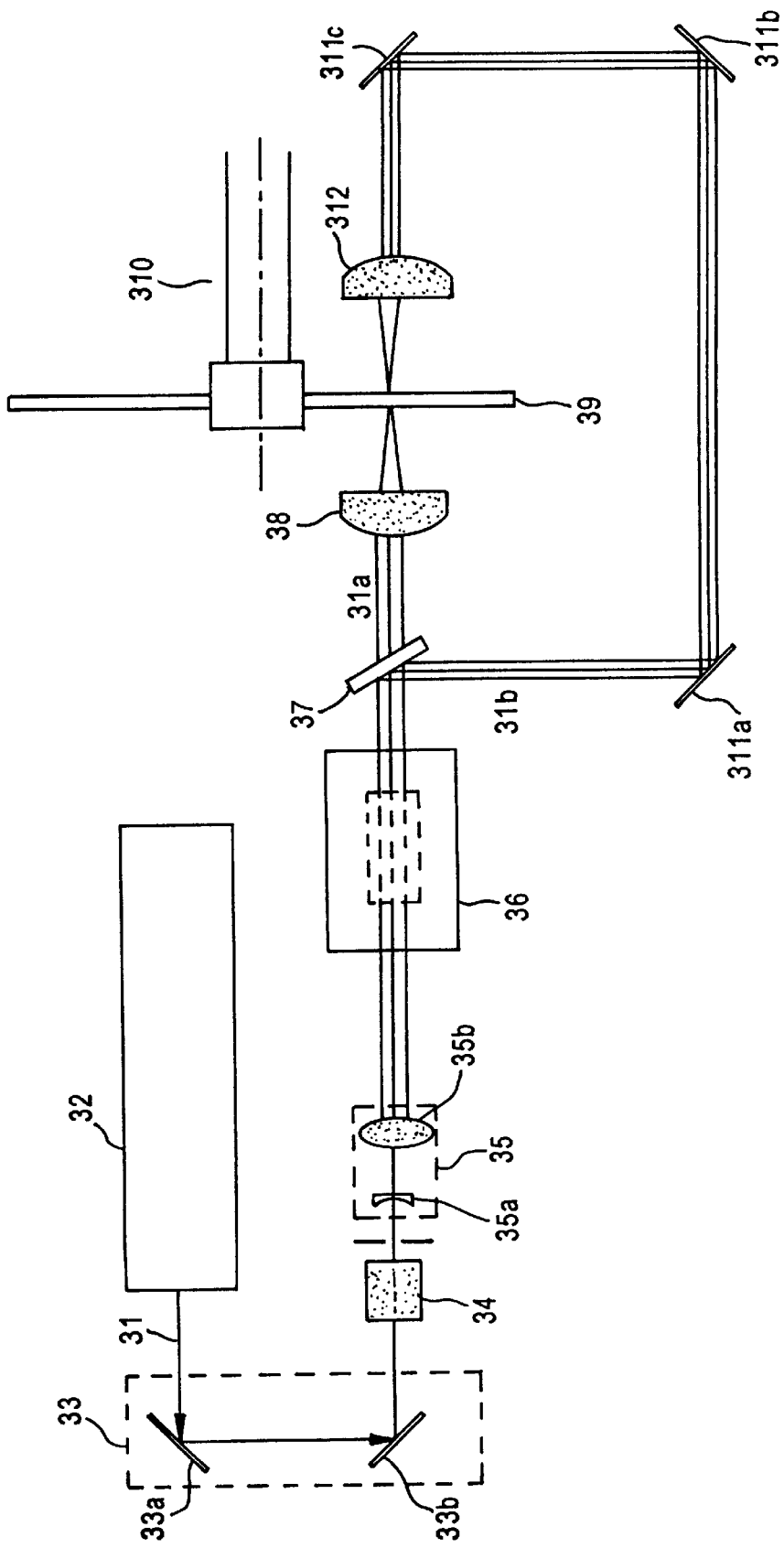
FIG. 3 schematically depicts a laser texturing system in accordance with another embodiment of the present invention.

Another embodiment of the present invention comprises texturing opposite surfaces of a glass or glass-ceramic substrate. Such an embodiment is schematically depicted in FIG. 3, wherein a laser light beam 31 generated by a $CO_2$ laser source 32 passes to beam delivery system 33 comprising mirrors 33a and 33b. Laser light beam 31 then passes through modulator 34, beam expander 35, comprising a concave lens 35a and a doublet achromatic lens 35b, and then through polarization rotator 36 to beam splitter 37 where it is separated into components 31a and 31b. Laser light beam component 31a passes to diffractive focusing lens 38 and is focused on a first surface of glass or glass-ceramic substrate 39 rotated by spindle 310. Laser light component 31b is reflected off mirrors 311a, 311b and 311c, such as silicon mirrors, to second diffractive focusing lens 312 and onto the opposite second surface of substrate 39. The diffractive focusing lenses 38 and 312 are advantageously coated with zinc selenide.

The laser texturing technique of the present invention for providing a desired topography on a glass or glass-ceramic substrate can be employed utilizing the multiple lens focusing system disclosed in copending application Ser. No. 08/666,374 for even greater accuracy. In addition, the laser texturing technique of the present invention can be practiced utilizing a crystal material, as disclosed in copending application Ser. No. 08/647,407, for accurate control of the spacings between protrusions. The laser texturing technique of the present invention can be employed utilizing both the multiple lens focusing system of copending application Ser. No. 08/666,374 and the crystal material as disclosed in copending application Ser. No. 08/647,407, now U.S. Pat. No. 5,783,797 e.g., by passing the laser light beam through a lens system and then through a crystal material, such as calcite, quartz, beta barium, potassium dihydrogen phosphate, ammonium dihydrogen phosphate and lithium niobate.

Figure 4A:
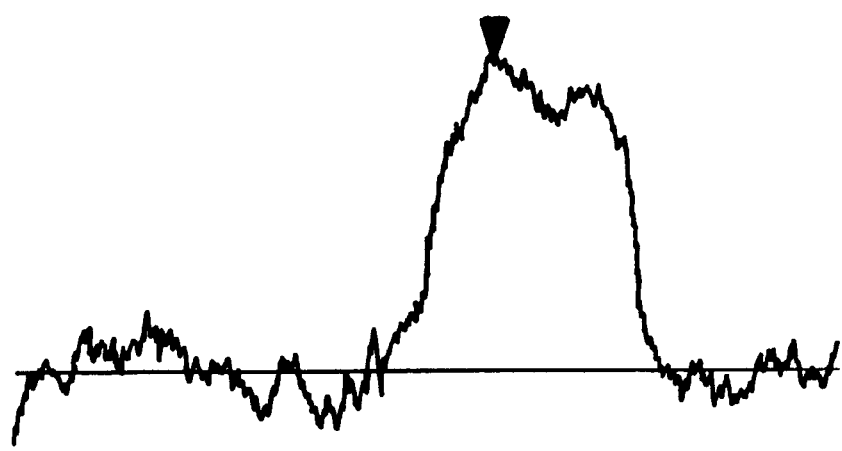
FIG. 4A is a mechanical stylus scan of a portion of a glass-ceramic substrate textured by a conventional heat treating recrystallization technique.
Figure 4B:
FIG. 4B is a mechanical stylus scan of a portion of a glass-ceramic substrate textured in accordance with the present invention.

In accordance with the present invention, a surface of a glass or glass-ceramic substrate is provided with an accurately controlled textured landing zone utilizing a pulsed, focused laser beam. The resulting laser texture comprises a plurality of accurately positioned protrusions controlled and shaped to optimize tribologic and magnetic requirements compatible with the escalating requirements for high density and mobile computer data storage applications, such as laptop computers. Commercially available glass or glass-ceramic substrates can be polished to provide a specular surface and a landing zone accurately formed thereon by the laser texturing technique in accordance with the present invention, leaving a specular data zone with maximized areal recording density. As shown in FIG. 4A, the protrusions formed on a (glass) (glass-ceramic) substrate by conventional heat treatment recrystallization are irregularly shaped and contain surrounding valleys extending into the substrate. However, the protrusions formed on a similar (glass) (glass-ceramic) substrate in accordance with the present invention using a $CO_2$ laser light beam, as shown in FIG. 4B, are relatively uniform with substantially no surrounding valleys extending substantially into the substrate.

The magnetic layers deposited in accordance with the present invention can be any of those conventionally employed in the production of magnetic recording media. Such conventional magnetic alloys, include, but are not limited to, cobalt (Co)-base alloys, such as cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base alloys having a thickness of about 100 Å to about 1000 Å, such as 200 Å to about 500 Å, has been found suitable.

As in conventional practices, an underlayer can be deposited on the textured substrate prior to depositing the magnetic layer. The underlayer can comprise Cr or a Cr-alloy, such as chromium-vanadium or chromium-titanium, oxygen-doped Cr, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques, deposited in conventional thicknesses employed in production of magnetic recording media.

The present invention can be employed to produce any of various types of magnetic recording media including thin film disks, with an attendant improvement in flying stability, glide performance and head-medium interface reliability. Moreover, the precise manner in which a landing zone is laser textured enables increased areal recording density and reduction in the size of head sliders.

Only the preferred embodiment of the invention and but a few examples of its versatility are shown and described in the present disclosure. It is to be understood that the invention is capable of use in various other combinations and environments and is capable of changes or modifications within the scope of the inventive concept as expressed herein.

We claim:

1. A method of manufacturing a magnetic recording medium, the method comprising:

texturing an upper surface of a glass-ceramic substrate with a pulsed, focused laser light beam to form a textured upper surface by localized crystallization.

2. The method according to claim 1, comprising laser texturing the upper surface to form a landing zone for contacting a transducer head during a contact start/stop method.

3. The method according to claim 2, further comprising depositing a magnetic layer on the textured upper surface, wherein texture of the upper surface is substantially replicated on the magnetic layer.

4. The method according to claim 2, wherein texture of the upper surface is substantially replicated on subsequently deposited layers.

5. The method according to claim 1, wherein the pulsed, focused laser light beam has a wavelength of about 10 $\mu$m.

6. The method according to claim 5, wherein the pulsed, focused laser light beam is derived from a $CO_2$ laser source.

7. The method according to claim 1, comprising initially passing a pulsed laser light beam through a doublet achromatic lens to form the pulsed focused laser light beam.

8. The method according to claim 1, comprising initially passing a pulsed laser light beam through a lens coated with lead selenide to form the pulsed, focused laser light beam.

9. The method according to claim 8, wherein the doublet achromatic lens is coated with lead selenide.

10. The method according to claim 2, comprising: polishing the upper surface of the substrate; and laser texturing a portion of the upper surface to form the landing zone leaving a polished data zone.

11. The method according to claim 1, comprising laser texturing the substrate while rotating the substrate.

12. The method according to claim 1, comprising: rotating the substrate at a rate of about 200 rpm to about 1500 rpm; and exposing the upper surface to the pulsed, focused laser beam for about 10 $\mu$sec to about 80 $\mu$sec at a pulse energy of about 20 microjoules to about 80 microjoules with a repetition rate of 1,000 to about 10,000 pulse/second.

13. The method according to claim 12, comprising: rotating the substrate at the rate of about 500 rpm to about 1000 rpm; and exposing the upper surface to the pulsed, focused laser beam for the pulse duration of about $\mu$sec to about 60 $\mu$sec, at the pulse energy of about 30 microjoules to about 60 microjoules, with the repetition rate (pulse/second) of about 3,000 to about 5,000 pulses/second.

14. The method according to claim 1, comprising passing a pulsed laser beam through a multiple lens focusing system comprising a first lens and a second lens spaced apart from and positioned between the first lens and the substrate surface to form the pulsed, focused laser light beam.

15. The method according to claim 1, comprising passing the pulsed, focused laser light beam through a crystal material thereby forming a pulsed, focused laser light beam with at least two energy peaks, and then impinging the pulsed, focused laser light beam with said at least two energy peaks on the upper surface of the substrate, thereby forming two focus points on the upper surface of the substrate.

16. The method according to claim 14, comprising passing the pulsed, focused laser light beam through a crystal material after passing through the first and second lenses, whereby the laser light beam has at least two energy peaks, and then impinging the pulsed, focused laser light beam on the upper surface of the substrate, thereby forming two focus points on the upper surface of the substrate.

* * * * *